(12) United States Patent
Pereira et al.

(10) Patent No.: US 9,102,411 B2
(45) Date of Patent: Aug. 11, 2015

(54) METHOD FOR CONTROLLING AN ELECTRICAL DEICING SYSTEM

(75) Inventors: David Pereira, Limours (FR); Laurence Lemains, St. Laurent de Brevedent (FR)

(73) Assignee: AIRCELLE, Gonfreville l'Orcher (FR)

( * ) Notice: Subject to any disclaimer, the term of this patent is extended or adjusted under 35 U.S.C. 154(b) by 1031 days.

(21) Appl. No.: 13/129,719

(22) PCT Filed: Aug. 26, 2009

(86) PCT No.: PCT/FR2009/001032
§ 371 (c)(1),
(2), (4) Date: May 17, 2011

(87) PCT Pub. No.: WO2010/055215
PCT Pub. Date: May 20, 2010

(65) Prior Publication Data
US 2011/0225975 A1    Sep. 22, 2011

(30) Foreign Application Priority Data
Nov. 17, 2008    (FR) ..................................... 08 06416

(51) Int. Cl.
| B64D 15/12 | (2006.01) |
| B64D 15/22 | (2006.01) |
| F02C 7/047 | (2006.01) |
| B64D 33/02 | (2006.01) |

(52) U.S. Cl.
CPC ................ B64D 15/12 (2013.01); B64D 15/22 (2013.01); *B64D 2033/0233* (2013.01); *F02C 7/047* (2013.01)

(58) Field of Classification Search
CPC ........ B64D 15/20; B64D 15/22; B64D 15/12; B64D 2033/0233; F02C 7/047
USPC ............................ 60/39.093, 779; 244/134 D
See application file for complete search history.

(56) References Cited

U.S. PATENT DOCUMENTS

| 3,596,264 A   | 7/1971  | Ciemochowski |
| 4,688,757 A   | 8/1987  | Cook |
| 4,831,819 A * | 5/1989  | Norris et al. ............... 60/39.093 |
| 6,151,567 A * | 11/2000 | Ames et al. ..................... 703/13 |
| 6,593,547 B1* | 7/2003  | Raad ............................ 219/201 |

(Continued)

FOREIGN PATENT DOCUMENTS

| EP | 1495963 A2    | 1/2005 |
| FR | 2875542 A1    | 3/2006 |
| GB | 772188        | 4/1957 |
| GB | 1082707       | 9/1967 |
| WO | 0110713 A1    | 2/2001 |
| WO | 2006136748 A2 | 12/2006 |

OTHER PUBLICATIONS

International Search Report PCT/FR2009/001032; Dated Jan. 14, 2010.

*Primary Examiner* — William H Rodriguez
*Assistant Examiner* — Carlos A Rivera
(74) *Attorney, Agent, or Firm* — Brinks Gilson & Lione

(57) ABSTRACT

The present invention relates to a method for commanding and controlling at least one resistive heating element (1) belonging to an aircraft turbojet engine nacelle deicing set, characterized in that it involves the steps aimed at: obtaining, from a central control unit (6) of the aircraft, parameters representative of the exterior flight conditions; determining a thermal model corresponding to the flight conditions obtained; as a function of the thermal model, delivering the appropriate corresponding electrical power (4) to the resistive heating element.

11 Claims, 2 Drawing Sheets

(56) References Cited

U.S. PATENT DOCUMENTS

| | | | |
|---|---|---|---|
| 8,049,147 B2* | 11/2011 | Hogate | 219/544 |
| 2007/0170312 A1* | 7/2007 | Al-Khalil | 244/134 A |
| 2008/0128556 A1* | 6/2008 | Platt | 244/134 F |
| 2010/0199629 A1* | 8/2010 | Chene et al. | 60/39.093 |
| 2010/0280730 A1* | 11/2010 | Page et al. | 701/100 |
| 2010/0319358 A1* | 12/2010 | Hogate | 60/779 |
| 2011/0277443 A1* | 11/2011 | Pereira et al. | 60/39.093 |
| 2014/0255879 A1* | 9/2014 | Lu | 434/45 |

\* cited by examiner

METHOD FOR CONTROLLING AN ELECTRICAL DEICING SYSTEM

TECHNICAL FIELD

The present invention relates to a deicing method, in particular for an air intake lip of a turbojet engine nacelle.

BACKGROUND

An airplane is propelled by one or more propulsion assemblies each comprising a turbojet engine housed in a tubular nacelle. Each propulsion assembly is attached to the airplane by a pylori generally located under a wing or at the fuselage.

A nacelle generally has a structure comprising an air intake upstream of the engine, a central section intended to surround a fan of the turbojet engine, a downstream section housing thrust reverser means and intended to surround the combustion chamber of the turbojet engine, and generally ends with a jet nozzle whereof the outlet is located downstream of the turbojet engine.

The air intake comprises, on one hand, an air intake lip suitable for allowing optimal collection towards the turbojet engine of the air needed to supply the fan and internal compressors of the turbojet engine, and on the other hand, a downstream structure on which the lip is attached and intended to suitably channel the air towards the blades of the fan. The assembly is attached upstream of the fan casing belonging to the upstream section of the nacelle.

In flight, depending on the temperature and humidity conditions, ice may form on the nacelle, in particular at the outer surface of the air intake lip. The presence of ice or frost alters the aerodynamic properties of the air intake and disrupts the conveyance of air towards the fan.

One solution for defrosting or deicing the outer surface consists of preventing ice from forming on that outer surface by keeping the concerned surface at a sufficient temperature.

Thus, it is known, for example from document U.S. Pat. No. 4,688,757, to take hot air at the turbojet engine compressor and convey it to the air intake lip to heat the walls. However, such a device requires a system of hot air intake pipes between the turbojet engine and the air intake, as well as a system for evacuating hot air at the air intake lip. This increases the mass of the propulsion assembly, which is not desirable.

These drawbacks were able to be offset by using electrical deicing systems.

EP 1 495 963 and a number of other documents relate to electrical deicing and its developments.

In order to lighten the structures used in the composition of nacelles, and more generally, aeronautic equipment, as much as possible, composite materials are used more and more in these structures. The air intake lip of a nacelle can in particular be made from composite materials.

The use of these materials poses certain problems in the context of an electrical deicing device.

Indeed, the exposure temperature of these materials generally must not exceed a critical threshold, subject to distorting the material and therefore damaging the structure. The temperature of the composite material should therefore be monitored so as to avoid any overheating, in particular locally, of the material.

One obvious solution is to equip the structure made from composite material with temperature sensors. However, such a solution does not make it possible to avoid certain local overheating between the sensors without substantially increasing the number of temperature sensors used. Such a solution also involves establishing a data transfer network for the data measured by the sensor, which makes the structure heavier and can make the deicing device particularly complex and not very practical in terms of its installation and implementation.

For reliability reasons, it could also be necessary to make the sensors redundant, which would further affect the mass of the structure and increase the complexity thereof.

BRIEF SUMMARY

One aim of the present invention is to provide an electrical deicing device that is effective without risking damaging the composite materials used.

To that end, the invention relates to a method for commanding and controlling at least one resistive heating element belonging to an aircraft turbojet engine nacelle deicing set, characterized in that it involves the steps aimed at:

obtaining, from a central control unit of the aircraft, parameters representative of the exterior flight conditions;

determining a thermal model corresponding to the flight conditions obtained;

as a function of the thermal model, delivering the appropriate corresponding electrical power to the resistive heating element.

Thus, by using a data set representative of the exterior flight conditions, this data being available at an airplane computer, it is possible to optimize the deicing of the different elements of the nacelle. Indeed, the exterior temperature, pressure, speed, etc. conditions are determining regarding the formation of ice on a surface of the nacelle.

These exterior flight conditions make it possible to situate the airplane inside a flight envelope, corresponding to a predetermined thermal model combining said flight envelope with values of the electrical power needed for deicing to be supplied to the resistive heating elements.

Preferably, the airplane central control unit is a FADEC (Full Authority Digital Engine Control). This control unit can also be designated using the acronym EEC (Electronic Engine Control).

Advantageously, the parameters representative of the exterior flight conditions are obtained via at least one data connection using an ARINC bus, the connection preferably being redundant.

Preferably, the parameters representative of the exterior flight conditions comprise at least one of the following parameters: exterior temperature, exterior pressure, airplane speed, humidity level.

Advantageously, the method according to the invention controls a plurality of resistive heating elements. Also advantageously, the resistive heating elements are distributed in at least two belts of resistive heating elements, the method aiming to deliver a unique electrical power to each belt, which may or may not be different, depending on the selected thermal model and the location of the belts. In this way, it is possible to provide different powers for, as an example, a first peripheral network of resistive heating elements located inside the air intake, a second peripheral network of resistive elements located at the lip, and a third peripheral network located slightly upstream of the lip of the nacelle.

Preferably, the applied thermal model is chosen from a plurality of thermal models comprising at least one thermal model corresponding to a cruising power, the other thermal models possibly being thermal models corresponding in particular to take-off ratings, climb settings, descent, wait before landing, and grounded airplane, inter alia.

Advantageously, the method comprises a loop for regulating the electrical power supplied to the resistive heating elements as a function of the power dissipated by said resistive heating elements.

Preferably, when a thermal model corresponding to a non-icing flight envelope is applied, the resistive heating elements are supplied according to a preheating method maintaining a predetermined temperature. This makes it possible to have better reactivity of the system upon entry into an icing flight envelope, while preventing a temperature peak and local overheating during an excessively fast temperature increase.

Advantageously, the method comprises a step for querying an ice detector, this query being done mainly when the applied thermal model corresponds to an icing flight envelope.

The present invention also relates to a device designed to allow the implementation of a method according to the invention.

It will of course be noted that this method and this device, although applied as an example to an air intake lip, are not limited thereto and can concern any surface likely to be subjected to ice.

BRIEF DESCRIPTION OF THE DRAWINGS

The present invention will be better understood in light of the following detailed description, done in reference to the appended drawing, in which.

DETAILED DESCRIPTION

Figure 1:
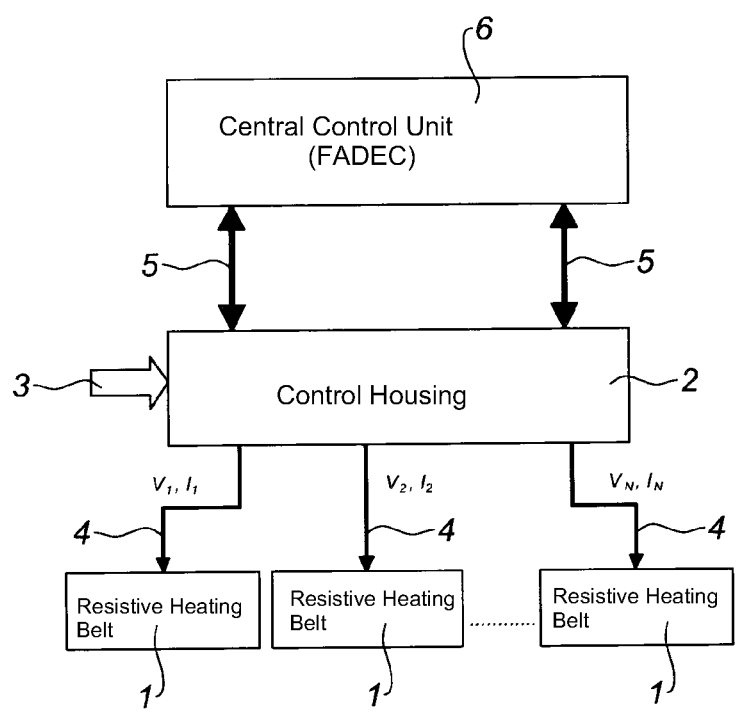
FIG. 1 is a diagrammatic illustration of a control device for an electrical deicing system according to the inventive method.

FIG. 1 diagrams a control device of the electrical deicing system for an air intake lip of a turbojet engine nacelle (not shown).

This air intake is equipped with a plurality of resistive heating elements grouped together in resistive element belts 1.

Advantageously, each resistive element belt corresponds to a particular zone of the air intake lip.

The resistive heating elements may for example be grouped together in a first peripheral belt comprising resistive heating elements located close to the inside (Int) of the air intake, a second peripheral belt comprising resistive heating elements located at the air intake lip of the nacelle, and a third peripheral belt comprising resistive heating elements located (D2) slightly upstream of the lip of the nacelle.

These various zones of the air intake lip can, although subject to the same exterior conditions, have different needs in terms of necessary deicing power.

The control device comprises a control housing 2 supplied by a 115 V or 230 V variable frequency alternating three-phase network 3, for example, the control housing 2 being able in turn to electrically supply the belts 1 of resistive heating elements through electrical outputs 4 by converting the alternating or direct supply voltage into a direct and regulated supply voltage for each belt 1.

Of course, depending on the needs, the output voltage can also be alternating.

Each electrical output 4 is dedicated and supplies one belt. Each belt 1 can therefore be supplied by a unique electrical voltage as a function of the electrical power necessary to deice the air intake lip zone covered by said belt 1.

The control housing 2 is also capable of measuring the current consumed by each heating belt 1. The power dissipated by each heating element is therefore determined fairly easily by the control housing 2 without needing to use any temperature sensors.

According to the inventive method, the control housing 2 uses information on the exterior flight conditions available at the FADEC 6. The exchange of data between the control housing 2 and the FADEC 6 is ensured by a redundant ARINC bus connection 5.

The interest of using the FADEC to obtain this data is that all of the information concerning the flight conditions is already available and reliabilized. The control housing 2 therefore uses the information from the FADEC to determine the electrical power to be supplied to the belts 1 of resistive heating elements as a function of the flight cases and the exterior conditions, and maintains that power from current and voltage measurements done by the same control housing 2.

In a traditional flight, there are in particular the following flight cases: take-off, climb, cruising power, descent, wait before landing, airplane grounded.

From existing thermal models, it is possible to determine the electrical power necessary for deicing for each belt 1 of resistive heating elements.

Table 1 below provides an example of the power necessary to deice an air intake lip of a nacelle with a diameter of 75.1 inches broken into three zones D1, D2, Int.

TABLE 1

| Case | Altitude (feet) | Speed (mach) | Exterior temperature (° C.) | Power density at 12 o/c | | | Power density at 6 o/c | | |
|---|---|---|---|---|---|---|---|---|---|
| | | | | D1 P (W/m$^2$) | D2 P (W/m$^2$) | Int P (W/m$^2$) | D1 P (W/m$^2$) | D2 P (W/m$^2$) | Int P (W/m$^2$) |
| MTO | 8000 | 0.192 | −2 | 2906 | 1889 | 9672 | 3873 | 4861 | 8044 |
| MTO | 15000 | 0.497 | −18 | 2906 | 1889 | 9672 | 3873 | 4861 | 12112 |
| Climb | 15000 | 0.388 | −8 | 2906 | 1889 | 13937 | 3873 | 4861 | 17159 |
| Cruising | 22000 | 0.785 | −30 | 2906 | 1889 | 7254 | 3873 | 4861 | 10598 |
| Descent | 15000 | 0.388 | −8 | 2906 | 1889 | 12694 | 3873 | 4861 | 12167 |
| Wait | 22000 | 0.629 | −20 | 2906 | 1889 | 13903 | 3873 | 4861 | 16049 |

MTO stands for Maximum Take-off.

12 o/c corresponds to the 12:00 position at the air intake lip, i.e. a position close to an attachment pylon.

6 o/c corresponds to the 6:00 position at the air intake lip.

From information obtained from the FADEC 6, the control housing 2 determines whether the airplane is moving in an icing envelope, and determines the applicable thermal model (case), and therefore the electrical power to be supplied to the heating belts 1 determined by that model.

Figure 2:
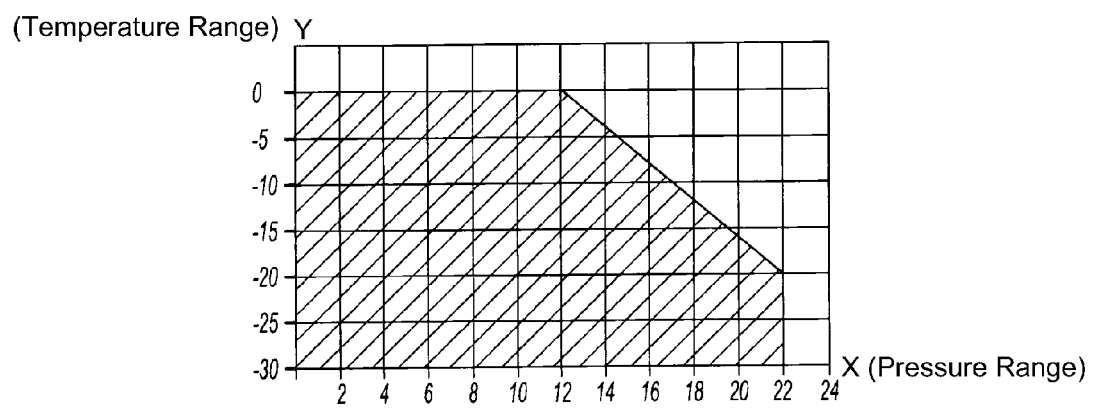
FIGS. 2 and 3 are graphic illustrations of icing flight envelopes as a function of the exterior temperature and pressure.
Figure 3:
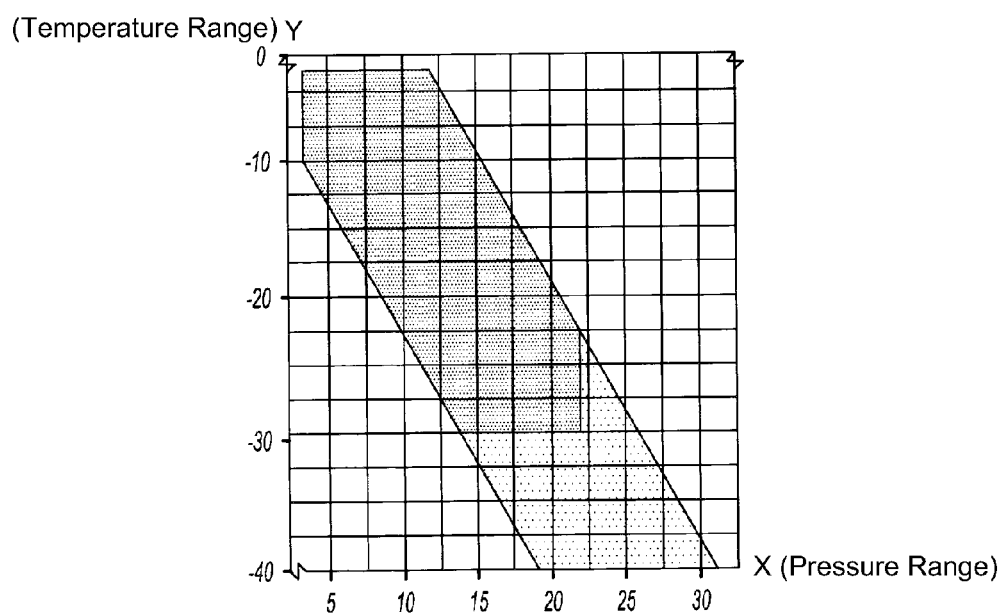

FIGS. 2 and 3 are images showing an icing envelope over a temperature range (° C.), on the Y axis, and a pressure range (altitude pressure: altitude at which the pressure reaches 1013.25 hPa), on the X axis.

When the airplane moves outside an icing envelope, the control housing supplies the belts 1 according to a preheating mode so as to maintain a predetermined temperature so that the system is as reactive as possible once the airplane enters an icing flight envelope.

An ice detector can be attached to the control housing 2, making it possible to apply the necessary electrical power only when the airplane is moving under effective icing conditions.

Although the invention has been described with one particular embodiment, it is obviously in no way limited thereto and encompasses all technical equivalents of the means described as well as combinations thereof if they are within the scope of the invention.

The invention claimed is:

1. A method for commanding and controlling at least one resistive heating element belonging to an aircraft turbojet engine nacelle deicing set, comprising:
   providing a controller in an airplane for storing a plurality of thermal models of the nacelle deicing set corresponding to an icing flight envelope of said airplane;
   wherein said controller is configured to:
      obtain, from a central control unit of the airplane, parameters representative of exterior flight conditions;
      situate the airplane inside a flight envelope using the exterior flight conditions;
      determine whether the airplane is moving into the icing flight envelope;
      select a thermal model from the plurality of thermal models corresponding to the icing flight envelope;
      apply an appropriate electrical power to the at least one resistive heating element, said appropriate electrical power varying as a function of the thermal model.

2. The method according to claim 1, wherein the airplane central control unit is a FADEC.

3. The method according to claim 1, wherein the parameters representative of the exterior flight conditions are obtained via at least one data connection using an ARINC bus.

4. The method according to claim 1, wherein the parameters representative of the exterior flight conditions comprise at least one of the following parameters: exterior temperature, exterior pressure, airplane speed, humidity level.

5. The method according to claim 1, further comprising controlling a plurality of resistive heating element.

6. The method according to claim 5, wherein the plurality of resistive heating elements are distributed in at least two belts of the resistive heating elements, and the method delivers a unique electrical power to each belt, which varies, depending on the selected thermal model and a location of the belts.

7. The method according claim 6, wherein the selected thermal model is chosen from the plurality of thermal models comprising at least one thermal model corresponding to a cruising power, other thermal models being thermal models corresponding to take-off ratings, climb settings, descent, wait before landing, and grounded airplane.

8. The method according to claim 1, further comprising a loop for regulating an electrical power supplied to the resistive heating elements as a function of a power dissipated by said resistive heating elements.

9. The method according to claim 1, wherein when a thermal model corresponding to a non-icing flight envelope is applied, the resistive heating elements are supplied according to a preheating method maintaining a predetermined temperature.

10. The method according to claim 9, further comprising querying an ice detector, the query being done at least when the applied thermal model corresponds to the icing flight envelope.

11. The method according to claim 3, wherein the at least one data connection is redundant.

* * * * *